US012015802B2

(12) United States Patent
Hsiang

(10) Patent No.: US 12,015,802 B2
(45) Date of Patent: Jun. 18, 2024

(54) METHOD AND APPARATUS FOR SIGNALING SLICE PARTITION INFORMATION IN IMAGE AND VIDEO CODING

(71) Applicant: HFI Innovation Inc., Zhubei (TW)

(72) Inventor: Shih-Ta Hsiang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/906,777

(22) PCT Filed: Apr. 1, 2021

(86) PCT No.: PCT/CN2021/084979
§ 371 (c)(1),
(2) Date: Sep. 20, 2022

(87) PCT Pub. No.: WO2021/199743
PCT Pub. Date: Oct. 7, 2021

(65) Prior Publication Data
US 2023/0119121 A1    Apr. 20, 2023

Related U.S. Application Data

(60) Provisional application No. 63/003,362, filed on Apr. 1, 2020.

(51) Int. Cl.
*H04N 19/82* (2014.01)
*H04N 19/172* (2014.01)
*H04N 19/70* (2014.01)

(52) U.S. Cl.
CPC .......... *H04N 19/82* (2014.11); *H04N 19/172* (2014.11); *H04N 19/70* (2014.11)

(58) Field of Classification Search
None
See application file for complete search history.

(56) References Cited

U.S. PATENT DOCUMENTS

| 10,531,111 B2 | 1/2020 | Li et al. |
| 2012/0106624 A1 | 5/2012 | Huang et al. |

(Continued)

FOREIGN PATENT DOCUMENTS

| CN | 107113422 A | 8/2017 |
| WO | 2020005031 A1 | 1/2020 |

OTHER PUBLICATIONS

TW Office Action dated Jan. 26, 2022 in Taiwan application No. 110112108.

(Continued)

*Primary Examiner* — Jessica M Prince
(74) *Attorney, Agent, or Firm* — McClure, Qualey & Rodack, LLP

(57) ABSTRACT

A method and apparatus for signaling or parsing picture partition information are disclosed. The current picture is partitioned into one or more slices and one or more tiles according to the picture partition information. A control syntax is determined, where the control syntax is signaled from the video bitstream at the encoder side or parsed from the video bitstream at the decoder side unless the picture partition information indicates that a rectangular slice mode is selected, each sub picture is allowed to contain more than one rectangular slice, and the current picture contains only one rectangular slice in the current picture. In-loop filtering is applied across slice boundaries if the picture partition information indicates multiple slices existing in the current picture and the control syntax indicates the in-loop filtering being enabled.

8 Claims, 3 Drawing Sheets

(56) References Cited

U.S. PATENT DOCUMENTS

| | | | |
|---|---|---|---|
| 2013/0101016 A1 | 4/2013 | Chong et al. | |
| 2013/0182755 A1 | 7/2013 | Chen et al. | |
| 2015/0016503 A1 | 1/2015 | Rapaka et al. | |
| 2015/0358623 A1 | 12/2015 | Li et al. | |
| 2019/0014325 A1 | 1/2019 | Lin et al. | |
| 2019/0082178 A1 | 3/2019 | Kim et al. | |
| 2020/0084454 A1 | 3/2020 | Liu et al. | |
| 2021/0195186 A1* | 6/2021 | Wu | H04N 19/119 |
| 2021/0274223 A1 | 9/2021 | Lim et al. | |
| 2022/0394301 A1* | 12/2022 | Deshpande | H04N 19/172 |
| 2022/0394306 A1* | 12/2022 | Zhang | H04N 19/174 |

OTHER PUBLICATIONS

International Search Report and Written Opinion dated Jun. 2, 2021, issued in application No. PCT/CN2021/084979.
Extended European Search Report dated Apr. 4, 2024, issued in application No. EP 21781114.0.
Hsiang, S-T., et al.; "AHG9: Signalling rectangular slice partitioning;" Joint Video Experts Team (JVET) of ITU-T SG 16 WP 3 and ISO/IEC JTC 1/SC 29/WG 11; pp. 1-3.

* cited by examiner

METHOD AND APPARATUS FOR SIGNALING SLICE PARTITION INFORMATION IN IMAGE AND VIDEO CODING

CROSS REFERENCE TO RELATED APPLICATIONS

The present invention claims priority to U.S. Provisional Patent Application Ser. No. 63/003,362, filed Apr. 1, 2020. The U.S. Provisional Patent Application is hereby incorporated by reference in its entirety.

FIELD OF THE INVENTION

The present invention relates to picture partition in a video coding system. In particular, the present invention relates to signaling partition information associated with partitioning a picture into slices and tiles.

BACKGROUND

High-efficiency video coding (HEVC) is the latest international video coding standard developed by the Joint Collaborative Team on Video Coding (JCT-VC) (Rec. ITU-T H.265 ISO/MC 23008-2 version 3: High Efficiency Video Coding, April, 2015). FIG. 1 provides the block diagram of the HEVC encoding system. The input video signal is predicted from the reconstructed signal (136), which is derived from the coded picture regions using Inter/Intra prediction (110). The prediction residual signal is processed by a linear transform (118). The transform coefficients are quantized (120) and entropy coded (122) together with other side information in the bitstream. The reconstructed signal (128) is generated from the prediction signal and the reconstructed residual signal after inverse transform (126) on the de-quantized transform coefficients (124). The reconstructed signal is further processed by in-loop filtering (e.g., de-blocking filter (DF) 130 and NDFs 131) for removing coding artifacts. The decoded pictures are stored in the frame buffer (134) for predicting the future pictures in the input video signal.

In HEVC, a coded picture is partitioned into non-overlapped square block regions represented by the associated coding tree units (CTUs). A coded picture can be represented by a collection of slices, each comprising an integer number of CTUs. The individual CTUs in a slice are processed in a raster scanning order. A bi-predictive (B) slice may be decoded using intra prediction or inter prediction using at most two motion vectors and reference indices to predict the sample values of each block. A predictive (P) slice is decoded using intra prediction or inter prediction using at most one motion vector and reference index to predict the sample values of each block. An intra (I) slice is decoded using intra prediction only.

A CTU can be partitioned into multiple non-overlapped coding units (CUs) using the recursivequadtree (QT) structure to adapt to various local motion and texture characteristics. One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual-quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of harm samples of size 4×4, and two corresponding transform blocks of chroma samples of a picture in 4:2:0 color format. An integer transform is applied to a transform block and the level values of quantized coefficients together with other side information are entropy coded in the bitstream. FIG. 2 illustrates an example of the block partitioning 210 (left) and its corresponding QT representation 220 (right).The solid lines indicate the CU boundaries and the dashed lines indicate the TU boundaries.

The terms coding tree block (CTB), coding block (CB), prediction block (PB), and transform block (113) are defined to specify the 2-D sample array of one color component associated with CTU, CU, PU, and TU, respectively. Thus, a CTU consists of one luma CTE, two chroma CTBs, and associated syntax elements. A similar relationship is valid for CU, PU, and TU. The tree partitioning is generally applied simultaneously to both luma and chroma, although exceptions apply when certain minimum sizes are reached for aroma.

The Joint Video Experts Team (JVET) of ITU-T SG16 WP3 and ISO/IEC JTC11/SC29/WG111 is currently in the process of establishing the next-generation video coding standard. Some promising new coding tools have been adopted into Versatile Video Coding (VVC) Draft in WET-Q2001 (B. Bross J. Chen, S. Liu, "Versatile Video Coding (Draft 8)," Document of Joint Video Experts Team of ITU-T SG16 WP3 and ISO/IEC ITC1/SC291WG11, JVET-Q2001, 17th Meeting: Brussels, BE, 7-17 Jan. 2020). In VVC Draft as specified in JVET-Q2001, a coded picture is partitioned into non-overlapped square block regions represented by CTUs, similar to HEVC. Each CTU can be partitioned into one or multiple smaller size coding units (CUs) by a quadtree with nested multi-type tree using binary and ternary split. The resulting CU partitions can be in square or rectangular shapes.

In the Versatile Video Coding (VVC) Draft as specified in JVET-Q2001, a tile is a sequence of CTUs that covers a rectangular region of a picture. The CTUs in a tile are scanned in raster scan order within that tile. A picture is divided into one or more tile rows and one or more tile columns. A slice consists of an integer number of complete tiles or an integer number of consecutive complete CTU rows within a tile of a picture. Two modes of slices are supported, namely the raster-scan slice mode and the rectangular slice mode, as indicated by the syntax element rect_slice _flag. In the raster-scan slice triode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice. FIG. 3 and FIG. 4 provide examples of partitioning a picture into tiles and slices in raster-scan slice mode and rectangular slice mode, respectively. FIG. 3 illustrates an example where a picture with 18 by 12 luma CTUs is partitioned into 12 tiles and 3 raster-scan slices. Each CTU is indicated by a small rectangle enclosed by dashed lines, each tile is indicated by solid thin lines, and each slice is indicated by a gray area enclosed by thick lines. FIG. 4 illustrates an example where a picture with 18 by 12 luma CTUs is partitioned into 24 tiles and 9 rectangular slices. The syntax element slice_address specifies the the raster scan tile index of the first tile in the slice.

The value of the syntax element num_tiles_in_slice_minus1 plus 1 specifies the number of the consecutive tiles in a current slice.

BRIEF SUMMARY OF THE INVENTION

A method and apparatus for signaling or parsing picture partition information are disclosed. According to the method, a current picture is partitioned into one or more slices and one or more tiles according to the picture partition information. A control syntax is determined, where the control syntax is signaled from the video bitstream at the encoder side or parsed from the video bitstream at the decoder side unless the picture partition information indicates that a rectangular slice mode is selected, each sub picture is allowed to contain more than one rectangular slice, and the current picture contains only one rectangular slice in the current picture. In-loop filtering is applied across slice boundaries if the picture partition information indicates multiple slices existing in the current picture and the control syntax indicates the in-loop filtering being enabled. The syntax is signaled or parsed from a slice header level of the video bitstream corresponding to the target slice.

DETAILED DESCRIPTION OF THE INVENTION

Figure 1:
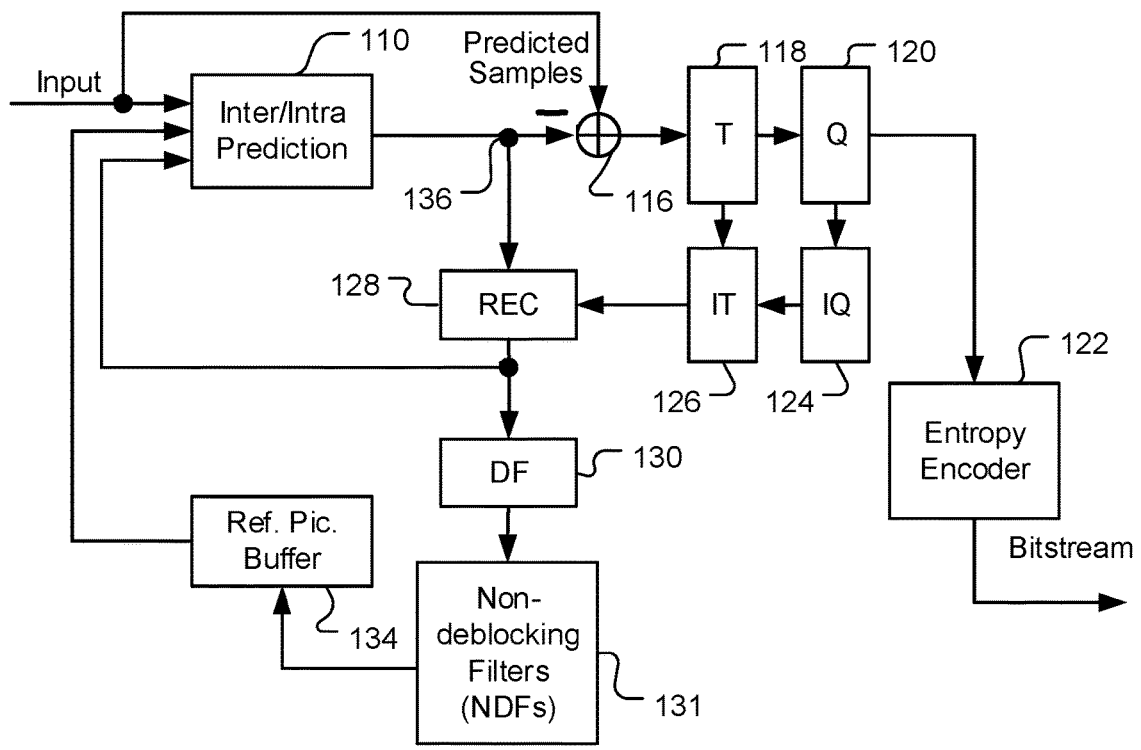
FIG. 1 illustrates an exemplary adaptive inter/intra video encoding system.
Figure 2:
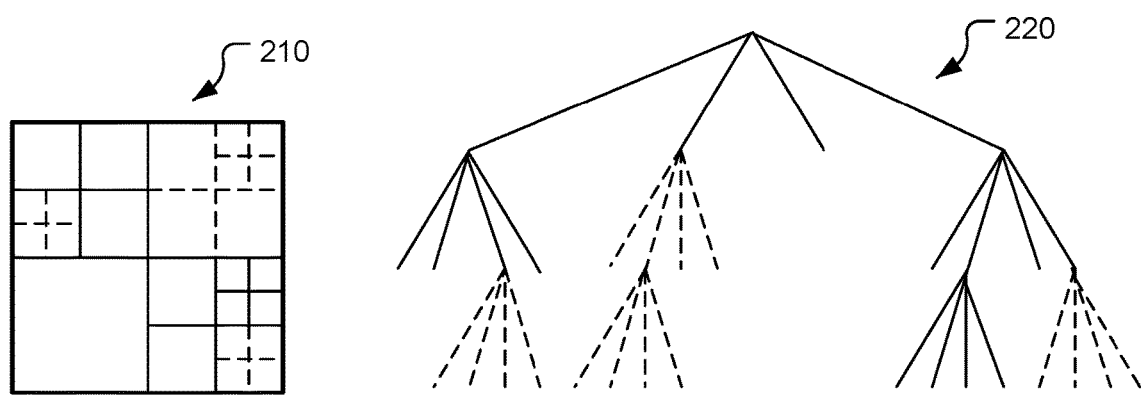
FIG. 2 illustrates an example of block partition, where a block partitioned result s shown on the left and a coding tree (also referred to as a partition tree structure) is shown on the right.
Figure 3:
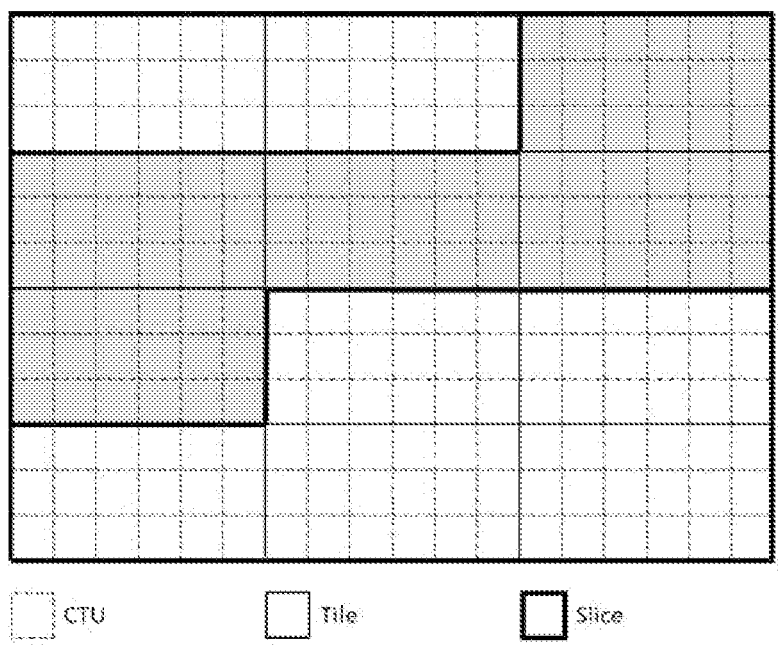
FIG. 3 illustrates an example of partitioning a picture into tiles and slices in the raster-scan slice mode, where the picture with 18 by 12 luma CTUs is partitioned into 12 tiles and 3 raster-scan slices.
Figure 4:
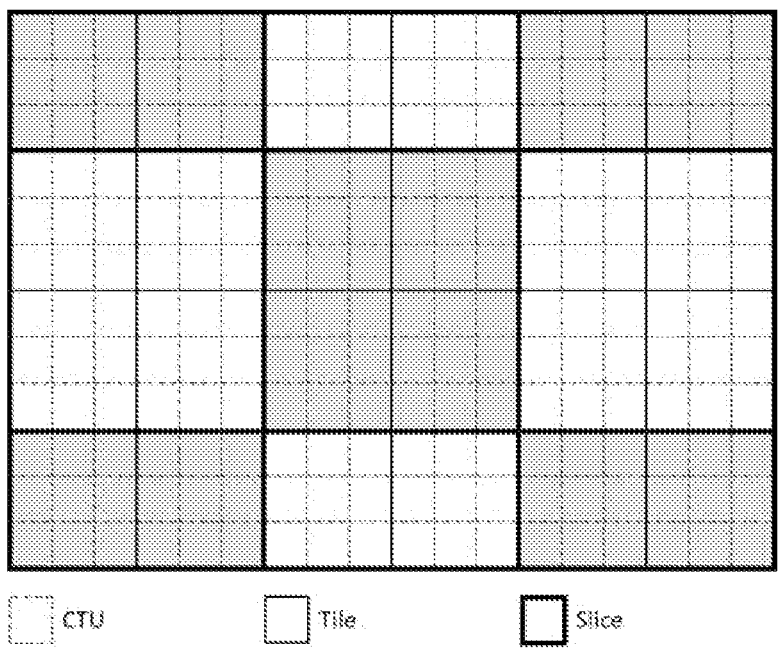
FIG. 4 illustrates an example of partitioning a picture into tiles and slices in the rectangular slice mode, where the picture with 18 by 12 luma CTUs is partitioned into 24 tiles and 9 rectangular slices.

The following description is of the best-contemplated mode of carrying out the invention. This description is made for the purpose of illustrating the general principles of the invention and should not be taken in a limiting sense. The scope of the invention is best determined by reference to the appended claims.

In the Versatile Video Coding (VVC) Draft as specified in JVET-Q2001, a tile is a sequence of CTUs that covers a rectangular region of a picture. The CFCs in a tile are scanned in raster scan order within that tile. A picture is divided into one or more tile rows and one or more tile columns. A slice consists of an integer number of complete tiles or an integer number of consecutive complete CTU rows within a tile of a picture. When the coded picture is to be further partitioned into more than one slice or one tile with the syntax element no_pic_partition_flag equal to 0, information for deriving the tile partitioning of a coded picture is signaled by the syntax elements pps_log2_ctu_size_minus5, num_exp_tile_columns_minus1, num_exp_tile_rows_minus1, and tile_row_height_minus1 in the picture parameter set (PPS). When rectangular slice anode is used (i.e., rect_slice_flag=1), a syntax element tile_idx_delta_present_flag may be signaled to specify whether the coded picture is partitioned into rectangular slice rows and rectangular slice columns in slice raster order. ile_idx_delta_present_flagequal to 0 specifies that tile_idx_delta[i] syntax elements are not present in the PPS and all pictures referring to the PPS are partitioned into rectangular slice rows and rectangular slice columns in slice raster order. tile_idx_delta_present_flag equal to 1 specifies that tile_idx_delta[i] syntax elements, indicating the difference between the tile index of the current slice and the tile index of the next slice, may be present in the PPS and all rectangular slices in pictures referring to the PPS are specified in the order indicated by the values of the tile_idx_delta[i] in increasing values of i. When the number of slices in the coded picture is equal to 1, the value of tile_idx_delta_present_flag is not signaled and is infrred to be equal to 0.

According to one aspect of the present invention, when the number of tiles in the coded picture is equal to 1, only one tile index equal to 0 is present in the coded picture and tile_idx_delta is never signaled. In Method 1, signaling tile_idx_delta_present_flag is further conditioned on the number of the tiles in the coded picture. In one embodiment, tile_idx_delta_present_flag is signaled only when the number of slices in the coded picture is greater than 1 and the number of the tiles in the coded picture is greater than an integer threshold value T, where T may be equal to 1, 2, or 3. When tile_idx_delta_present_flag is not signaled, it is inferred to be equal to 0.

According to another aspect of the present invention, when the number of tile columns or the number of tile rows in the coded picture is equal to 1, the coded picture is always partitioned into rectangular slice rows and rectangular slice columns in slice raster order (either vertically or horizontally).

In Method 2, signaling tile_idx_delta_present_flag is further conditioned on whether the number of tile columns or the number of tile rows in the coded picture is greater than 1 in the coded picture. In one embodiment, tile_idx_delta_present_flag is signaled only when the number of slices in the coded picture is greater than 1 and the number of tile columns or the number of tile rows in the coded picture is greater than When tile_idx_delta_present_flag is not signaled, it is inferred to be equal to 0.

According to another aspect of the present invention, the syntax control flag specifying whether in-loop filtering operations shall be applied across slice boundaries is relevant only for the coded pictures containing more than one slice. In the proposed method, this control flag is signaled conditioned on whether the number of the slices in the coded picture is greater than 1 or not.

In one example embodiment, the video coder as specified in NET-Q2001 is modified according to the present invention using Method 2 for signaling tile_idx_delta_present_flag. The modified syntax table is provided in Table 1 for the PPS. In the proposed method, tile_idx_delta_present_flag is signaled only when the number of slices in the coded picture is greater than 1 and the number of tile columns or the number of tile rows in the coded picture is greater than 1. The syntax element loop_filter_across_slices_enabled_flag, specifying whetherin-loop filtering operations may be performed across slice boundaries in pictures referring to the PPS, is not signaled when the rectangular slice mode is used with the number of the coded slice equal to 1.

TABLE 1

The modified syntax table based on JVET-Q2001 according to the proposed methods

| | Descriptor |
|---|---|
| pic_parameter_set_rbsp( ) { | |
|   pps_pic_parameter_set_id | ue(v) |
|   .... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0: i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 && ( NumTileColunms > 1 \|\| NumTileRows > 1 )) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_delta_present_flag \|\| SliceTopLeftTileIdx[ i ] % NumTileColumns = = 0 ) ) | |
|           slice_height_in_tiles_minus1[ i ] | ue(v) |
|         if( slice_width_in_tiles_minus1[ i ] = = 0 && slice_height_in_tiles_minus1[ i ] = = 0 && RowHeight[ SliceTopLeftTileIdx[ i ] / NumTileColumns ] > 1 ) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ i ][ j ] | ue(v) |
|           i += NumSlicesInTile[ i ] − 1 | |
|         } | |
|         if( tile_idx_delta_present_flag && i < num_slices_in_pic_minus1 ) | |
|           tile_idx_delta[ i ] | se(v) |
|       } | |
|     } | |
|   loop_filter_across_tiles_enabled_flag | |
|   if( !( rect_slice_flag && !single_slice_per_subpic_flag && num_slices_in_pic_minus1 = = 0 ) ) | *Note(1) |
|     loop_filter_across_slices_enabled_flag | u(1) |
|   .... | |
| } | |

Any of the foregoing proposed methods can be implemented in encoders and/or decoders. For example, any of the proposed methods can be implemented in a high-level syntax encoding module an encoder, and/or a high-level syntax decoding module of a decoder. Alternatively, any of the proposed methods can be implemented as a circuit integrated to the high-level syntax encoding module of the encoder and/or the high-level syntax decoding module of the decoder. Any of the foregoing proposed methods can also be implemented in image encoders and/or decoders, wherein the resulting bitstream corresponds to one coded frame only using intra-picture prediction.

Figure 5:
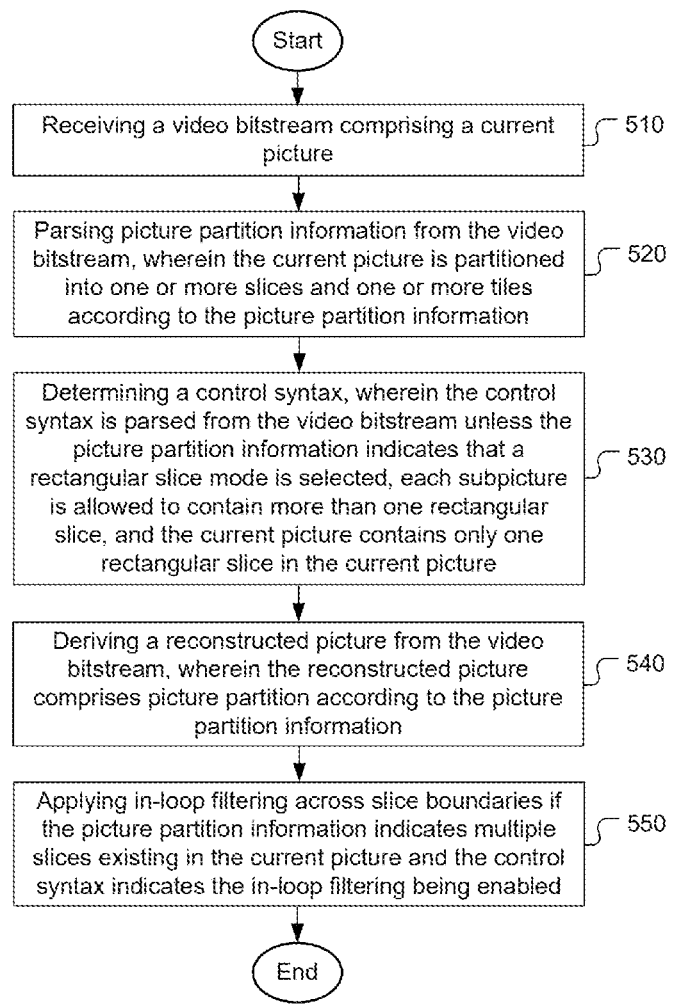
FIG. 5 illustrates a flowchart of an exemplary video decoding system according to an embodiment of the present invention, where a syntax related to a number of tiles in a target slice is parsed if the address of the target slice does not correspond to a last tile index of the current picture and the raster-scan slice anode is used for picture partition.

FIG. 5 illustrates a flowchart of an exemplary video decoding system according to an embodiment of the present invention, where a control syntax for controlling whether to apply in-loop filter across slice boundaries is parsed if a set of conditions are satisfied. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, a video bitstream comprising a current picture is received in step 510. Picture partition information is parsed from the video bitstream in step 520, wherein the current picture is partitioned into one or more slices and one or more tiles according to the picture partition information. A control syntax is determined, wherein the control syntax is parsed from the video bitstream unless the picture partition information indicates that a rectangular slice mode is selected, each sub picture is allowed to contain more than one rectangular slice, and the current picture contains only one rectangular slice in the current picture in step 530. A reconstructed picture is derived from the video bitstream in step 540, wherein the reconstructed picture comprises picture partition according to the picture partition information. In-loop filtering is applied across slice boundaries if the picture partition information indicates multiple slices existing in the current picture and the control syntax indicates the in-loop filtering being enabled in step 550.

A flowchart of an exemplary video encoding system corresponding to the decoder in FIG. 5 can be derived accordingly.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the all that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes mid other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning mid range of equivalency of the claims are to be embraced within their scope.

The invention claimed is:

1. A method for decoding a video sequence, the method comprising:
   receiving a video bitstream comprising a current picture;
   parsing picture partition information from the video bitstream, wherein the current picture is partitioned into one or more slices and one or more tiles according to the picture partition information;
   determining a control syntax indicating whether in-loop filtering across slice boundaries is enabled, wherein parsing of the control syntax from the video bitstream is bypassed when each of the following is met: the picture partition information indicates that a rectangular slice mode is selected, each sub picture is allowed to contain more than one rectangular slice, and the current picture contains only one rectangular slice in the current picture;
   deriving a reconstructed picture from the video bitstream, wherein the reconstructed picture comprises picture partition according to the picture partition information; and
   applying in-loop filtering across slice boundaries when the picture partition information indicates multiple slices existing in the current picture and the control syntax indicates the in-loop filtering across the slice boundaries being enabled.

2. The method of claim 1, wherein the control syntax is in PPS (Picture Parameter Set) level of the video bitstream.

3. The method of claim 1, wherein the control syntax is inferred to have a value indicating no in-loop filtering across the slice boundaries when the picture partition information indicates that the rectangular slice mode is selected, each sub picture is allowed to contain more than one rectangular slice, and the current picture contains only one rectangular slice in the current picture.

4. An apparatus for decoding a video sequence, the apparatus comprising one or more electronic circuits or processors arranged to:
   receive a video bitstream comprising a current picture;
   parse picture partition information from the video bitstream, wherein the current picture is partitioned into one or more slices and one or more tiles according to the picture partition information;
   determine a control syntax indicating whether in-loop filtering across slice boundaries is enabled, wherein parsing of the control syntax from the video bitstream is bypassed when each of the following is met: the picture partition information indicates that a rectangular slice mode is selected, each sub picture is allowed to contain more than one rectangular slice, and the current picture contains only one rectangular slice in the current picture;
   derive a reconstructed picture from the video bitstream, wherein the reconstructed picture comprises picture partition according to the picture partition information; and
   apply in-loop filtering across slice boundaries when the picture partition information indicates multiple slices existing in the current picture and the control syntax indicates the in-loop filtering across the slice boundaries being enabled.

5. A method for encoding a video sequence, the method comprising:
   receiving input data corresponding to a current picture;
   partitioning the current picture into one or more slices and/or one or more tiles;
   signaling picture partition information in a video bitstream;
   determining a control syntax indicating whether in-loop filtering across the slice boundaries is enabled, wherein signaling of the control syntax in the video bitstream is bypassed when each of the following is met: the picture partition information indicates that a rectangular slice mode is selected, each sub picture is allowed to contain more than one rectangular slice, and the current picture contains only one rectangular slice in the current picture; and applying in-loop filtering across slice boundaries when more than one slice exists in the current picture and the control syntax indicates the in-loop filtering across the slice boundaries being enabled.

6. The method of claim 5, wherein the control syntax is in PPS (Picture Parameter Set) level of the video bitstream.

7. The method of claim 5, wherein the control syntax is inferred to have a value indicating no in-loop filtering across the slice boundaries when the picture partition information indicates that the rectangular slice mode is selected, each sub picture is allowed to contain more than one rectangular slice, and the current picture contains only one rectangular slice in the current picture.

8. An apparatus for encoding a video sequence, the apparatus comprising one or more electronic circuits or processors arranged to:

receive input data corresponding to a current picture;

partition the current picture into one or more slices and/or one or more tiles;

signal picture partition information in a video bitstream;

determine a control syntax indicating whether in-loop filtering across the slice boundaries is enabled, wherein signaling of the control syntax in the video bitstream is bypassed when each of the following is met: the picture partition information indicates that a rectangular slice mode is selected, each sub picture is allowed to contain more than one rectangular slice, and the current picture contains only one rectangular slice in the current picture; and apply in-loop filtering across slice boundaries when more than one slice exists in the current picture and the control syntax indicates the in-loop filtering across the slice boundaries being enabled.

* * * * *